July 19, 1949.

W. A. BARY 2,476,397

ROTARY ENGINE OR COMPRESSOR

Filed July 26, 1945

WOLDEMAR A. BARY
INVENTOR

BY John P. Milronow
ATTORNEY

July 19, 1949.  W. A. BARY  2,476,397
ROTARY ENGINE OR COMPRESSOR

Filed July 26, 1945  3 Sheets-Sheet 2

WOLDEMAR A. BARY
INVENTOR

BY John P. Mironow
ATTORNEY

July 19, 1949.  W. A. BARY  2,476,397
ROTARY ENGINE OR COMPRESSOR
Filed July 26, 1945  3 Sheets-Sheet 3
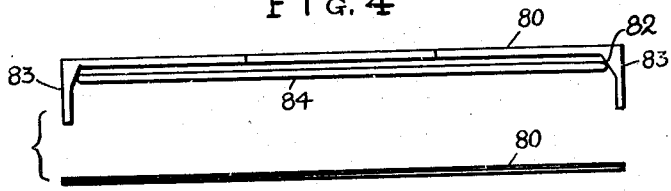
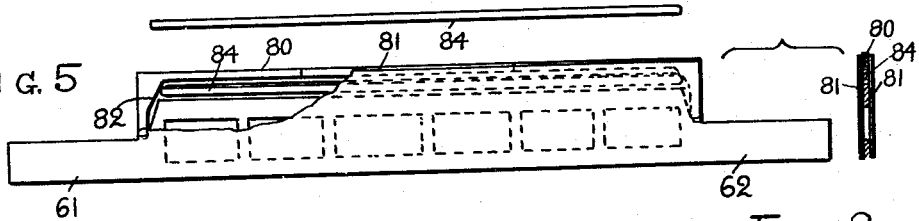
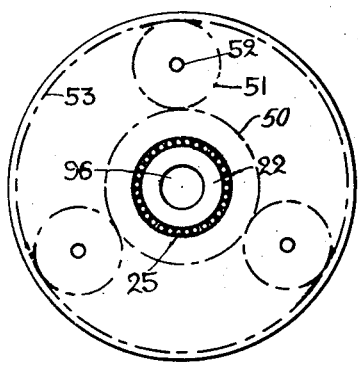
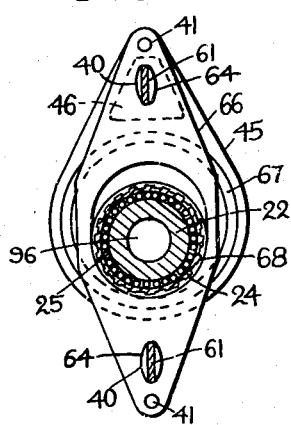
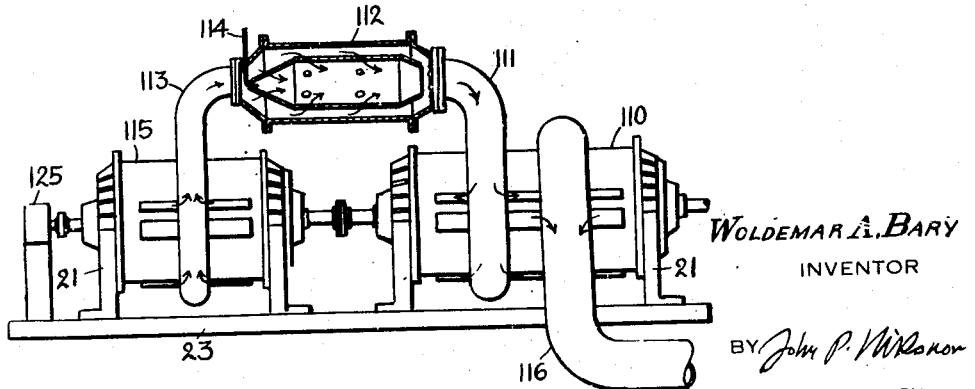
Woldemar A. Bary
INVENTOR
BY John P. Wilson
ATTORNEY Patented July 19, 1949

2,476,397

UNITED STATES PATENT OFFICE 2,476,397

ROTARY ENGINE OR COMPRESSOR

Woldemar A. Bary, New York, N. Y., assignor of fifty per cent to Leon Alexander Samoiloff, Brooklyn, N. Y.

Application July 26, 1945, Serial No. 607,177

15 Claims. (Cl. 121—85)

My invention relates to rotary engines or compressors, also pumps, including vacuum pumps, and has particular reference to engines or compressors with positive displacement for operation with elastic and non-elastic fluids.

More particularly my invention relates to rotary expansion engines, to rotary compressors, and to the combinations of rotary continuous combustion gas expansion engines with rotary compressors and a combuster, as a prime moving assembly.

Many attempts have been made in the past to construct rotary combustion engines of a positive displacement. A rotary elastic fluid engine has distinct advantages over gas turbines, particulary in that the efficiency of a gas rotary engine remains high over a wide range of speeds so that the engine can be built for any desired speed without the necessity of introducing expensive and heavy power consuming gears or electric drive, such as are usually necessary with turbines. For the same reason the rotary compressor of a positive displacement type has an advantage that it can be operated at any desired speed with high efficiency.

The compressor and the turbine, as used today, are both of multistage axial-flow, high speed, steam turbine type. At each stage, pressure energy of the gases is converted into velocity at the stationary nozzles and, in turn, velocity is converted into mechanical energy at the moving blades. As the word "multistage" implies, the process is repeated many times as the gases pass from one stage to the next. The present-day gas turbine is a single speed and a high speed, usually geared, machine.

My complete rotary continuous combustion engine assembly also has a compressor and a rotary engine on one shaft, a combuster between the two, and a starter, but my variable speed compressor is a single stage compressor of higher efficiency, and my engine is a single stage expansion engine, thereby eliminating the complexity of construction, of multistaging, and all the losses resulting therefrom. (Present Westinghouse gas turbine set, for instance, has for 40 lbs. pressure, a compressor with 21 stages and a turbine with 6 stages.) Having no nozzles and no change of gas velocity from stage to stage, my compressor, as well as my rotary engine, can operate at various and variable speeds over large ranges, similar to a conventional reciprocating gasoline engine.

The compressor and the engine when used in my power assembly, are almost identical in principle of operation, design and construction, but differing in size, each consisting of a cylindrical rotor with an even number of sliding vanes, under positive control, revolving in a noncylindrical stationary shell, with a multiple odd number of compression or expansion chambers working in parallel.

My rotary machine is adapted to operate as an ordinary rotary compressor, as a vacuum pump, as a pump for almost any liquid, as a rotary steam expansion engine or as a rotary continuous combustion gas engine. Its efficiency is extremely high on account of the following features: Elimination of major portion of friction between the blades and the shell, due to centrifugal force, by balancing the entire blade system of the rotor under a positive control, making it possible to operate at high speeds; and substantial elimination of leakage by the introduction of a positive centrifugal packing at all joints. I also provide a thermal protection of bearings and of the vane control mechanism for high temperature operation engine unit, and balanced thermal expansion of housing thereby eliminating axial bending of the same.

The inability in the past to solve the problems involved in bringing about these improvements has been the main reason why rotary machines of this type have not been in wider use. My improvements have increased the efficiency of the machines to such an extent that it is possible to use such a compressor and such a gas rotary engine in combination with a combuster to form an operating variable speed high efficiency "rotary continuous combustion gas engine set" having a very wide and diversified field of application, with capacities covering a range from a few to several thousand H. P.

Up to now it has been found very difficult to construct a gas rotary engine, a rotary compressor or a rotary pump for reasonably high speeds because sliding vanes, usually provided in such apparatus, being subjected to the action of the centrifugal force, progressively increase their pressure on the peripheral walls of the casing in which the vanes move, thereby lowering prohibitively the efficiency of such machines. Moreover, such an increased friction results in an abnormally rapid wear of the rubbing surfaces so that these surfaces become rough, still further increasing the friction, and developing considerable leakage past the blades, until the machine becomes unsuitable for normal operation completely.

My invention has for its object to provide a rotary gas engine, liquid pump, vacuum pump, steam engine or rotary compressor with radially sliding vanes, in which the vanes are so mechanically interconnected and positively driven that the effect of the centrifugal force is largely eliminated and the machine can be operated at any desired speed without undue wear and loss of efficiency.

Another object of my invention is to provide means for sealing the sliding vanes whereby any leakage past the vanes is eliminated at all joints over a wide range of speeds.

Another object of my invention is to provide means for protecting main shaft bearings and vane control mechanism from the action of the hot gases in the operating chamber or chambers of the machine.

Another object of my invention is to provide means for balancing the operating pressures at different peripheral points of the machine.

Another object of my invention is to provide means to prevent deformation of the housing due to the uneven temperature at different points.

Another object of my invention is to provide means for balancing the rotating parts so as to eliminate vibrations.

These and other objects, features and advantages of my invention are more fully explained in the accompanying specification and drawings in which—

Fig. 4 is a detail view of a sealing strip;

Fig. 5 is a detail view of a vane with sealing strip;

Fig. 6 is a detail view of gears for operating the vanes;

Fig. 7 is a front view of the vane operating mechanism;

Fig. 8 is a side view of the same;

Fig. 9 is an elevational view of an assembly of the engine with a comressor, combuster and starter.

Figure 1:
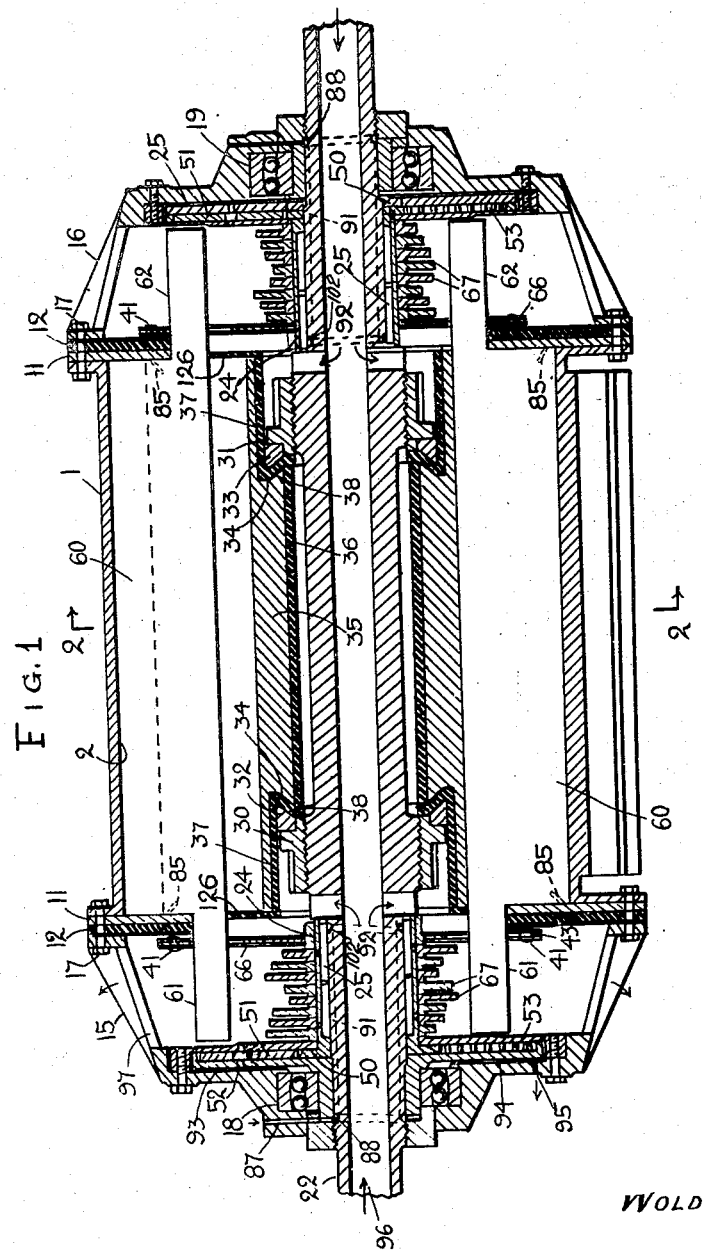
Fig. 1 is a sectional elevational view of my rotary combustion engine, compressor or pump.

My rotary combustion engine comprises a tubular housing 1 having eccentric recesses 2, 3, 4 inside, forming expansion or compression chambers in connection with exhaust openings or ports 5, 6, 7 and intake openings or ports 8, 9, 10. The eccentric recesses are placed symmetrically around the concentric shaft, or their angular distances from each other along the periphery are equal. Such an arrangement provides a symmetrical distribution of the high temperature zones in the housing, during operation of the engine. Each hot zone, extending axially in the housing, produces a thermal expansion, tending to bend the housing into an arc. However, since these forces are distributed symmetrically, they are balanced, eliminating any tendency to cause such uneven bending effect. The chambers are closed at the ends by metal flanges 11 with insulation rings 12 which are clamped to the ends of the housing 1 by end bells or brackets 15, 16 which are attached to the ends of the housing as by studs 17. The brackets are provided with antifriction bearings 18, 19 for a hollow shaft 22. The brackets have flanges 20 for mounting on posts 21 on a foundation on a base 23 (Fig. 9).

At each end of the housing there is a cam shaft 24, rotatively mounted on the main shaft 22 by means of needle bearings 25. Each cam shaft is connected at one end to the main shaft 22 by a planetary transmission comprising a sun pinion 50 secured on the end of the cam shaft 24, satellites 51 on stationary shafts 52 supported in the end cover 15, and an internal gear 53 mounted on the end of the main shaft 22. The ratio of the gears is made $(n-1):1$ when $n$ is the number of combustion chambers used. With three combustion chambers, as shown in the drawings, the ratio will be 2:1, for rotating the eccentric shaft at a speed three times the speed of the main shaft, for operating the vanes as will be explained hereinafter. The middle portion of the main shaft is threaded at the ends for nuts 30, 31 with tapering clamping rings 32, 33. The latter engage recesses 34 at the ends of a tubular rotor 35. Insulation tubes 36, 37 are placed between the rotor and the shaft, and insulation washers 38 are placed between the recesses 34 and the clamping rings 32, 33. The rotor ends are also covered by insulating slotted discs 126. The operating chamber with its control mechanism and the main shaft are thereby thermally insulated from the rotor.

The rotor is provided with a plurality of radial slots 55 extending longitudinally from one end of the rotor to the other. Vanes 60 are slidably fitted in the slots 55 and are provided with extensions 61, 62 at the ends of the rotor. These extensions are engaged by elongated slots or holes 64 in the ends of connecting links 66 (only one pair of vanes and links are shown in Fig. 1). Insulation spacers 40 may be provided in the links for preventing or retarding flow of the heat from the vanes to the links. The vanes are arranged in pairs, one vane in each pair being placed diametrically opposite the other, and each link thus connecting together the opposite vanes of one pair.

Each link 66 consists of two plates connected at the ends by pins or rivets 41, with spacers 43 at one end. At the other end of link 66 the pin 41 with a self-lubricating bearing also engages a corresponding hole in the end of a connecting rod 45. The rod 45 is provided with a clearance hole 46 for the extension 61 or 62 of the vane and is rotatively mounted on an eccentric 67. The eccentric or cam is splined at 68 (Fig. 7) to the cam shaft 24. The length of the connecting link is such that the distance between the outer edges of the vanes is slightly less than the distance between diametrically opposite points of the inner surface of the housing. The curvature of the housing at the eccentric recesses is so selected that the distance between the diametrically opposite points is the same all around, and the clearance between the edges of the vanes and the housing is substantially uniform. The successive eccentrics are progressively angularly set back in accordance with the angular distances between the successive vanes. The retarding angle between eccentrics equals the angle between adjacent vanes multiplied by $n-1$ where $n$ is the number of chambers. The vanes are thereby positively driven and at no time touch the inner surface of the housing.

For sealing the clearances between the outer edges of the vanes and the inner surfaces of the housing, strips 80 are provided, slidably fitted between side flanges in the vanes. The strips are pressed against the inner peripheral surface of the housing by the centrifugal force. The pressure, however, is very slight, sufficiently only for the purpose of sealing the clearance between the ends of the vanes and the housing but not large enough to cause any appreciable friction and undue wear. Two or more strips are placed side by side to insure a perfect seal. The individual strips are shorter than the distance between the ends of the rotor and the points of junction of the strips are staggered to prevent leakage of gases past the strips. The strips are provided at the ends with inward extensions 83 engaging the inner sides of the end flange 11. The inner edges 82 of the extensions 83 are tapered or cam-shaped as shown in Fig. 5, and Fig. 4, and are engaged by the ends of the spreader bars 84 sliding between the plates 81 under the strips 80. The spreader bars are urged outwards by the centrifugal force and bear at the ends on the tapered edges 82 thereby pushing the strips 80 outward into engagement with the flanges 11. The strips therefore provide an effective seal for the vanes not only along the outer edges but also at the ends. Additional sealing strips 85 are provided in peripherally disposed slots in the ends of the rotor 35 spanning the spaces between vanes 60 near the outer edge of the rotor for sealing the clearances between the ends of the rotor and the respective flanges 11. The slots containing sealing strips 85 are inclined outwards so that the centrifugal force tends to press the strips outwardly against the flanges 11.

Each eccentric depression or recess 2, 3 and 4 acts as a cylinder of an engine, expansion and power stroke taking place from the intake port 8, 9 or 10 to the highest point 86 in the recesses, beyond which point begins exhaust, or acts as a compression chamber when the engine operates in the opposite direction as a compressor. The eccentric connecting rod provides positive movement of the vanes entirely eliminating any pressure from the vanes on the walls of the housing as otherwise would have been caused by the centrifugal force. The sealing strips 80 and bars 84 are subjected to the centrifugal force but their weight is so small that their friction is negligible as regards the wear of the cylinder as well as its effect on the efficiency of the engine. The effect of the centrifugal force on the projection portions of the vanes is mutually balanced in the three recesses 2, 3 and 4 or a still larger multiple odd number of recesses so that it has no effect on the balancing of the rotor.

The bearing surfaces of the eccentrics are lubricated with heat resisting oil under pressure. Oil is fed through ducts 87 into oil grooves 88 and passes through channels 91 to the second oil groove 102 to the needle bearings 25. The oil reaches the gears by return grooves and passes through ducts 93 into the main bearings 18, 19 and is exhausted through ducts 94, 95. The return grooves also supply oil to eccentrics 67 which are splined on the cam shafts 24. The temperature of the end housing where the eccentrics are located is substantially lowered by the insulation around the rotor and between the rotor and the main shaft and by the air cooling arrangement with air entering through the bore 96 in the hollow main shaft and through the radial openings 92 in the shaft and leaving through the opening 97 in the end covers of the housing, whereby the air in the chamber is circulated by the ends 61 and 62 of the vanes working as blades of an air fan.

The complete assembly of a power unit is shown in Fig. 9. The rotary engine 110 receives a charge of hot burning gases through an intake pipe 111 from a combuster 112 which in turn receives compressed air by a pipe 113 from a rotary compressor 115, fuel being fed by a pipe 114. Exhaust gases from the engine escape through a pipe 116. A starter 125 is provided for the engine.

In the operation of compressor-engine assembly, air delivery of the compressor is proportional to the speed only and the torque of the engine is proportional to the pressure only. The limiting element of the operation, within the speed range, is the maximum temperature allowed by the metallurgy of today. Operating at this top temperature and controlled by fuel feed alone, a top performance of the assembly is obtained; horse power and fuel being substantially proportional to speed, the torque remains constant. Therefore, at any speed, reduction of the horsepower and torque can be obtained by the same fuel feed control, reducing the feed which in turn reduces the temperature and pressure. The top speed is limited only by the mechanical strength of the machine and is measured in thousands of R. P. M.

Figure 2:
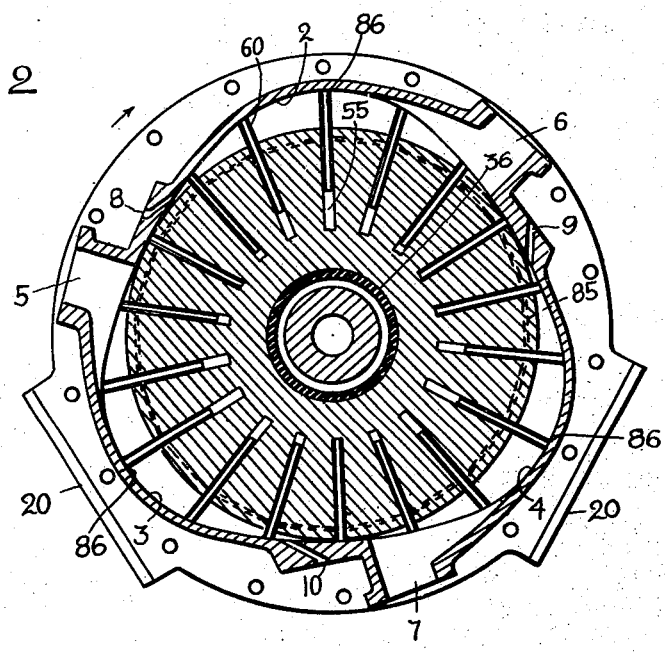
Fig. 2 is a sectional view of the same, taken on the line 2—2 in Fig. 1 for rotary engine and compressor.

It should be noted that the compressor has the same general construction as the engine shown in Figs. 1 and 2 except that the insulation is not necessary.

Figure 3:
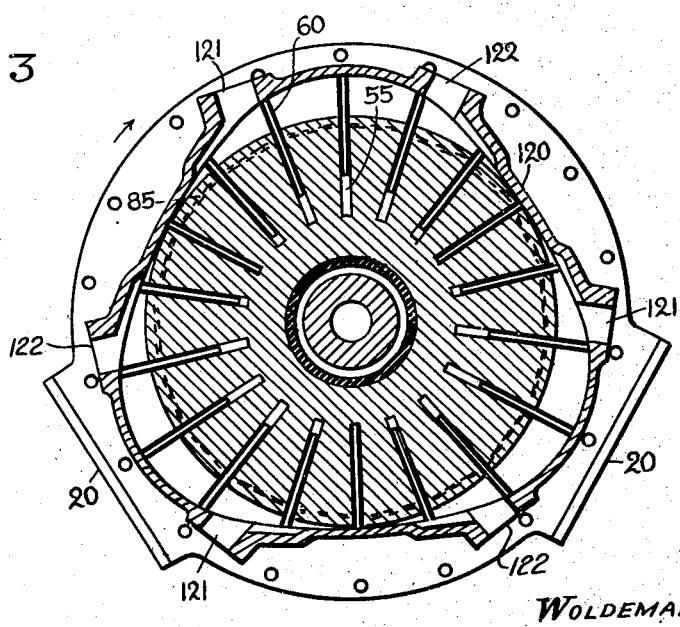
Fig. 3 is a similar sectional view of a pump.

My rotary engine is also adapted to be used as a pump, liquid or vacuum, as shown in Fig. 3. The housing 120 of the pump is provided with intake ports 121 near the discharge ports 122, the relative positions of the ports being such that the space formed by two blades at the end of the suction operation should be equal to the space at the beginning of the exhaust operation. The number of the blades between the intake and discharge ports depends on the degree of vacuum or pressure desired.

My engine can also operate with steam. The expansion ratio in such a case is made to conform to the available live steam and exhaust pressures.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A rotary engine comprising a tubular housing having an intake opening and an exhaust opening, the inner walls of the housing being formed with eccentric recesses so shaped that the distance between diametrically opposite points in the housing is the same for its entire inner periphery; a main shaft rotatively mounted in the housing; a rotor mounted on the shaft and provided with a plurality of pairs of diametrically opposite radial slots; vanes slidably fitted in the slots; links connecting diametrically opposite vanes, the distance between the outer edges of each pair of diametrically opposite vanes being slightly less than the distance between the diametrically opposite points in the housing; a cam shaft concentric to the main shaft; means to rotate the cam shaft by the main shaft; means for operatively connecting the vanes to the cam shaft for positively moving the vanes in the rotor, the housing being so shaped that the clearance between the inner surface thereof and the vanes is maintained substantially uniform.

2. A rotary engine comprising a tubular housing having an intake opening and an exhaust opening, the inner walls of the housing being formed with eccentric recesses so shaped that the distance between diametrically opposite points in the housing is the same for its entire inner periphery; a main shaft rotatively mounted in the housing; a rotor mounted on the shaft and provided with a plurality of diametrically opposite radial slots; vanes slidably fitted in the slots; links connecting diametrically opposite vanes, the distance between the outer edges of each pair of diametrically opposite vanes being slightly less than the distance between the diametrically opposite points in the housing; a cam shaft concentric to the main shaft; means to rotate the cam shaft by the main shaft; means for operatively connecting the vanes to the cam shaft for positively moving the vanes in the rotor, the housing being so shaped that the clearance between the inner surface thereof and the vanes is maintained substantially uniform; and sealing members movably supported in corresponding slots in the peripheral and in the end portions of the vanes, the sealing members slidably engaging the inner walls of the housing and constructed to be urged outward by the centrifugal force.

3. A rotary engine according to claim 2, in which each sealing member comprises a plurality of strips which are shorter than the slot in which they are supported, and in which these strips are placed side by side in overlapping relation in the slot, the strips having inwardly projecting cam portions at their ends adjacent the ends of the slots, and a movable member under the strips in each slot engaging the cam portions of the strips for moving the strips radially outwardly and also endwise under the action of centrifugal force as the rotor turns.

4. A rotary engine comprising a tubular housing having an intake opening and an exhaust opening, the inner walls of the housing being formed with a plurality of eccentric recesses so shaped that the distance between diametrically opposite points in the housing is the same for its entire inner periphery; a main shaft rotatively mounted in the housing; a rotor mounted on the shaft and provided with a plurality of radial slots; vanes slidably fitted in the slots; links connecting diametrically opposite vanes, the distance between the outer edges of each pair of diametrically opposite vanes being slightly less than the distance between the diametrically opposite points in the housing; a cam shaft concentric to the main shaft; means to rotate the cam shaft by the main shaft at a ratio to cause each cam to make one complete revolution to every eccentric recess; means for operatively connecting the vanes to the cam shaft for positively moving the vanes in the rotor, the housing being so shaped that the clearance between the inner surface thereof and the vanes is maintained substantially uniform; sealing members engaging the inner walls of the housing; and sealing members movably supported on the rotor and slidably fitted in slots in the outer edges of the vanes.

5. A rotary engine comprising a tubular housing, the inner walls of the housing being formed with a plurality of circumferentially spaced eccentric recesses so shaped that the distance between diametrically opposite points in the housing is the same for its entire inner periphery; an intake opening and an exhaust opening for each eccentric recess; a shaft rotatively mounted in the housing; a rotor mounted on the shaft and provided with a plurality of radial slots; vanes slidably fitted in the slots; links connecting diametrically opposite vanes, the distance between the outer edges of each pair of diametrically opposite vanes being slightly less than the distance between the diametrically opposite points in the housing; a cam shaft concentric to the main shaft; means for operatively connecting the vanes to the cam shaft for positively moving the vanes in the rotor, the housing being so shaped that the clearance between the inner surface thereof and the vanes is maintained substantially uniform; sealing members slidably fitted in slots in the outer edges of the vanes and engaging the inner walls of the housing; and sealing members slidably fitted in slots in the end portions of the rotor and constructed to be actuated by the centrifugal force for engaging the inner surface of the end portions of the housing.

6. A rotary engine comprising a tubular housing having an intake opening and an exhaust opening, the inner walls of the housing having recesses so shaped that the distance between the diametrically opposite points in the housing is the same for the entire inner periphery of the housing; a rotor rotatively mounted in the housing and provided with a plurality of radial slots; vanes slidably fitted in the slots; links connecting the diametrically opposite vanes, the length of the links being such as to maintain the distance between the outer edges of the diametrically opposite vanes slightly less than the distance between the diametrically opposite points in the housing; the links being mounted for a rectilinear reciprocating motion and a plurality of eccentric members operated by the rotor and operatively connected to the links for reciprocating the links thereby positively moving the vanes in the rotor, the housing being so shaped that the clearance between the vanes and the inner surface of the housing is maintained substantially uniform.

7. A rotary engine comprising a tubular housing having an intake opening and an exhaust opening, the inner walls of the housing having recesses so shaped that the distance between the diametrically opposite points in the housing is the same for the entire inner periphery of the housing; a main shaft rotatively mounted in the housing; a rotor on the shaft provided with a plurality of radial slots; vanes slidably fitted in the slots; links connecting the ends of the inner portions of the diametrically opposite vanes, the length of the links being such as to maintain the distance between the outer edges of the diametrically opposite vanes slightly less than the distance between the diametrically opposite points in the housing; sealing members movably supported at the outer edges of the vanes for engaging the inner surfaces of the housing; a cam shaft rotatively supported by the main shaft; a plurality of eccentrics secured on the cam shaft; each eccentric being pivotally connected to a pair of the diametrically opposite vanes; the housing being so shaped relative to the path described by the eccentrics that the clearance between the vanes and the inner surface of the housing is maintained substantially uniform and means to rotate the cam shaft.

8. A rotary engine comprising a tubular housing having an intake opening and an exhaust opening, the inner walls of the housing being formed with eccentric recesses, so shaped that the distance between diametrically opposite points in the housing is the same for its entire inner periphery; hollow end brackets attached to the ends of the housing; a main shaft rotatively supported in the end brackets; a rotor mounted on the middle portion of the shaft and provided with a plurality of longitudinally extending radial slots; vanes slidably fitted in the slots, portions of the vanes extending beyond the ends of the rotor; links connecting the extending portions of the diametrically opposite vanes, the distance between the outer edges of the diametrically opposite vanes being slightly less than the distance between the diametrically opposite points in the housing; cam shafts rotatively mounted in the housing; cam shafts rotatively mounted on the portions of the main shaft in the hollow brackets; connecting rods operatively connecting the diametrically opposite vanes; cams on the cam shafts for positively moving the vanes in the rotor, the housing being so shaped relative to the path described by the vanes that the clearance between the vanes and the inner surface of the housing is maintained substantially uniform; sealing strips slidably fitted in the vanes for slidably engaging the inner walls of the housing; and means to rotate the cam shafts at a speed greater than the speed of the main shaft depending on the number of the eccentric recesses in the housing.

9. A rotary engine comprising a tubular housing having an intake opening and an exhaust opening, the inner walls of the housing being formed with eccentric recesses, so shaped that the distance between diametrically opposite points in the housing is the same for its entire inner periphery; hollow end brackets attached to the ends of the housing; a main shaft rotatively supported in the end brackets; a rotor mounted on the middle portion of the shaft and provided with a plurality of longitudinally extending radial slots; vanes slidably fitted in the slots, portions of the vanes extending beyond the ends of the rotor; links connecting the extending portions of the diametrically opposite vanes, the distance between the outer edges of the diametrically opposite vanes being slightly less than the distance between the diametrically opposite points in the housing; cam shafts rotatively mounted on the portions of the main shaft in the hollow brackets; connecting rods operatively connecting the diametrically opposite vanes; cams on the cam shafts for positively moving the vanes in the rotor, the housing being so shaped relative to the path described by the vanes that the clearance between the vanes and the inner surface of the housing is maintained substantially uniform; sealing strips slidably fitted in the vanes for slidably engaging the inner walls of the housing; means to rotate the cam shafts at a speed greater than the speed of the main shaft in the ratio $(n-1):1$, when $n$ is the number of the eccentric recesses in the housing and the cam shaft and the main shaft rotate in the opposite directions; and heat insulating partitions in the housing between the ends of the rotor and the space in the brackets for the cam shafts and connecting links.

10. A rotary engine comprising a tubular housing having an intake opening and an exhaust opening, the inner walls of the housing being provided with eccentric recesses so formed that the distance between the diametrically opposite points in the housing is the same for the entire inner periphery of the housing; hollow end brackets attached to the end portions of the housing; a main shaft rotatively supported in the end covers; a cylindrical rotor mounted on the middle portion of the shaft and provided with longitudinally extending radial slots; vanes slidably fitted in the slots; portions of the vanes extending beyond the ends of the rotor into the brackets; links connecting extensions of the diametrically opposite vanes; cam shafts rotatively mounted on the portions of the main shafts in the brackets; a plurality of similar eccentrics secured on the cam shafts; each eccentric being pivotally connected to a corresponding link, the successive eccentrics being axially spaced along the cam shaft and progressively, circumferentially displaced around the cam shaft axis by an angle $(n-1)$ times the angle between the adjacent vanes, $n$ being equal to number of compression chambers and arranged for positively maintaining the outer edges of the vanes spaced from the inner surface of the housing; sealing members supported at the edges of the vanes slidably engaging the inner surfaces of the housing; geared connections between the main shaft and the cam shafts, the main shaft being hollow and provided with radial openings for admitting air for cooling the parts located in the end brackets.

11. A rotary engine comprising a tubular housing having an intake opening and an exhaust opening, the inner walls of the housing being provided with eccentric recesses so formed that the distance between the diametrically opposite points in the housing is the same for the entire inner periphery of the housing; hollow end brackets attached to the end portions of the housing; a main shaft rotatively supported in the end covers; a cylindrical rotor mounted on the middle portion of the shaft and provided with longitudinally extending radial slots; means to clamp the rotor on the shaft; vanes slidably fitted in the slots having end portions extending beyond the ends of the rotor; links connecting the extending portions of the diametrically opposite vanes; cam shafts rotatively mounted on the portions of the main shaft beyond the ends of the rotor; a plurality of similar eccentrics secured on the cam shaft; connecting rods rotatively mounted on the eccentrics, pivotally connected to the respective links, the successive eccentrics being axially spaced along the cam shaft and progressively, circumferentially displaced around the cam shaft axis, the housing being so shaped relative to the path described by the eccentrics that the clearance between the inner surface thereof and the vanes is maintained substantially uniform; sealing members supported at the edges of the vanes and in the end portions of the rotor slidably engaging the inner surface of the housing; gear connection between the cam shafts and the main shaft for rotating the main shaft at a rate of speed different from the speed of the cam shafts, the ratio of the speed of the main shaft to the cam shafts corresponding to the number of the eccentric recesses in the housing plus or minus one depending on the direction of rotation of the cam shaft relative to the main shaft; and means to insulate the rotor from the main shaft and from the space in the end brackets.

12. A rotary engine comprising a tubular housing having an intake opening and an exhaust opening, the inner walls of the housing being provided with eccentric recesses so formed that the distance between the diametrically opposite points in the housing is the same for the entire inner periphery of the housing; hollow end brackets attached to the end portions of the housing; a main shaft rotatively supported in the end covers; a cylindrical rotor mounted on the middle portion of the shaft and provided with longitudinally extending radial slots; means to clamp the rotor on the shaft; vanes slidably fitted in the slots having end portions extending beyond the ends of the rotor; links connecting the extending portions of the diametrically opposite vanes; cam shafts rotatively mounted on the portions of the main shaft beyond the ends of the rotor; a plurality of similar eccentrics secured on the cam shaft; connecting rods rotatively mounted on the eccentrics, pivotally connected to the respective links, the successive eccentrics being axially spaced along the cam shaft and progressively, circumferentially displaced around the cam shaft axis the housing being so shaped relative to the path described by the eccentrics that the clearance between the inner surface thereof and the vanes is maintained substantially uniform; sealing members supported at the edges of the vanes and in the end portions of the rotor slidably engaging the inner surface of the housing; gear connection between the cam shafts and the main shaft for rotating the main shaft at a rate of speed different from the speed of the cam shafts, the ratio of the speed of the main shaft to the cam shafts corresponding to the number of the eccentric recesses in the housing; insulation layers between the rotor and the main shaft; and insulation partitions in the housing at the ends of the rotor having slots for the extensions of the vanes.

13. In a rotary engine of the type in which a rotor provided with a plurality of longitudinally extending radial slots having vanes slidably mounted therein rotates within a housing having eccentric recesses so shaped that the distance between diametrically opposite points within the housing is uniform, each vane being connected to a diametrically opposite vane and being controlled in its movement so that the outer edge thereof always clears the inner wall of the housing by a small substantially uniform distance, the combination of vanes whose outer edges have slots extending longitudinally the full length thereof, a plurality of sealing strips placed side by side in the slot in each vane, each strip being shorter than the length of the vane and overlapping another strip, the strips having inwardly extending cam portions at their ends adjacent the ends of the vane, and a member movably supported under the strips in each vane engaging the cam portions of the strips for moving them endwise in opposite directions under the action of centrifugal force as the rotor turns.

14. In a rotary engine of the type in which a rotor provided with a plurality of longitudinally extending radial slots having vanes slidably mounted therein rotates within a housing having eccentric recesses so shaped that the distance between diametrically opposite points within the housing is uniform, each vane being connected to a diametrically opposite vane and being controlled in its movement so that the outer edge thereof always clears the inner wall of the housing by a small substantially uniform distance, the combination with a circumferentially extending slot in each end face of the rotor, said circumferentially extending slots being spaced slightly inwardly from the periphery of the rotor and extending at an angle to the rotor axis, of sealing strips slidably mounted in said circumferentially extending slots, said sealing strips spanning the spaces between the vanes and being movable outwardly against the housing ends under the action of centrifugal force as the rotor turns.

15. A rotary pumping engine comprising a tubular housing having intake and exhaust openings, the inner walls of the housing being formed with an eccentric recess so shaped that the distance between diametrically opposite points in the housing is the same for its entire inner periphery, the intake openings being located at the diverging portions of the eccentric recesses and the outlet openings being located at the converging portions of the eccentric recesses; a main shaft rotatably supported by the end portions of the housing; a rotor mounted on the shaft and provided with a plurality of radial slots; vanes slidably fitted in the slots; links connecting the ends of diametrically opposite vanes, the distance between the outer edges of the diametrically opposite vanes being slightly less than the distance between the diametrically opposite points in the housing; cam shafts rotatively mounted on the main shaft; means to operate the cam shafts by the main shaft; means for operatively connecting each link to the respective cam shaft for positively and rectilinearly reciprocating the links thereby moving the vanes in the rotor so as to maintain substantially uniform clearances at all points between the outer edges of the vanes and the inner surfaces of the housing and means in the vanes to seal the clearances.

WOLDEMAR A. BARY.

REFERENCES CITED

The following references are of record in the file of this patent:

UNITED STATES PATENTS

| Number | Name | Date |
|---|---|---|
| 222,439 | Barrow | Dec. 9, 1879 |
| 705,835 | Grove | July 29, 1902 |
| 797,621 | Smith | Aug. 22, 1905 |
| 1,009,213 | Augustine | Nov. 21, 1911 |
| 1,015,411 | Webb | Jan. 23, 1912 |
| 1,582,922 | Freud | May 4, 1926 |
| 1,595,093 | Helm | Aug. 10, 1926 |
| 1,634,269 | Pannell | July 5, 1927 |
| 2,048,825 | Smelser | July 28, 1936 |

FOREIGN PATENTS

| Number | Country | Date |
|---|---|---|
| 430,715 | Great Britain | June 24, 1935 |